(No Model.) 9 Sheets—Sheet 1.
G. JOHNSON, Jr.
MACHINE FOR MAKING TONGUE AND GROOVE FLOORING.
No. 366,841. Patented July 19, 1887.
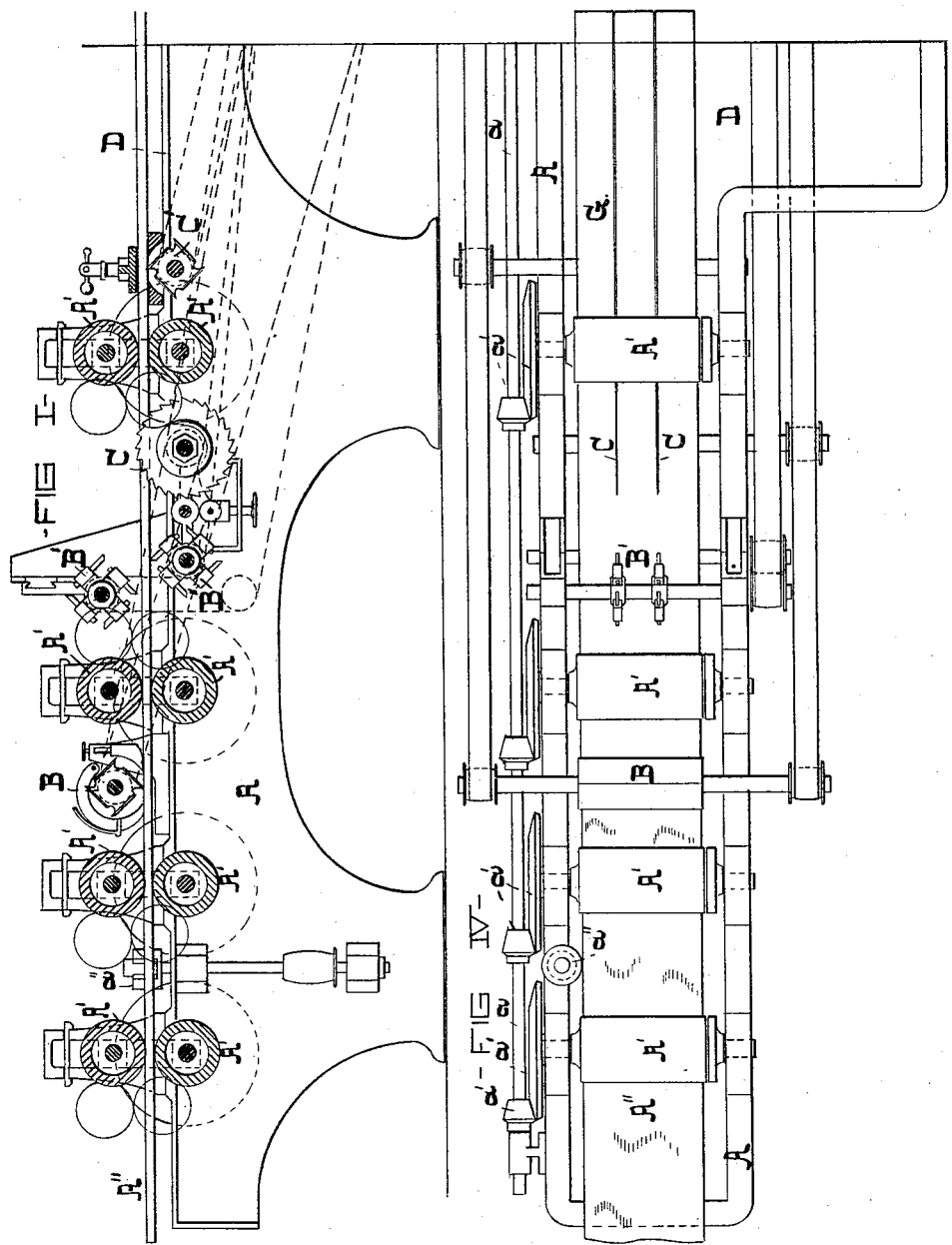
Witnesses:
Edward A. Osso,
Dan'l Fisher
Inventor
GREENLEAF JOHNSON JR.
by G.H. & W.T. Howard,
Att'ys.

(No Model.) 9 Sheets—Sheet 2.
G. JOHNSON, Jr.
MACHINE FOR MAKING TONGUE AND GROOVE FLOORING.
No. 366,841. Patented July 19, 1887.
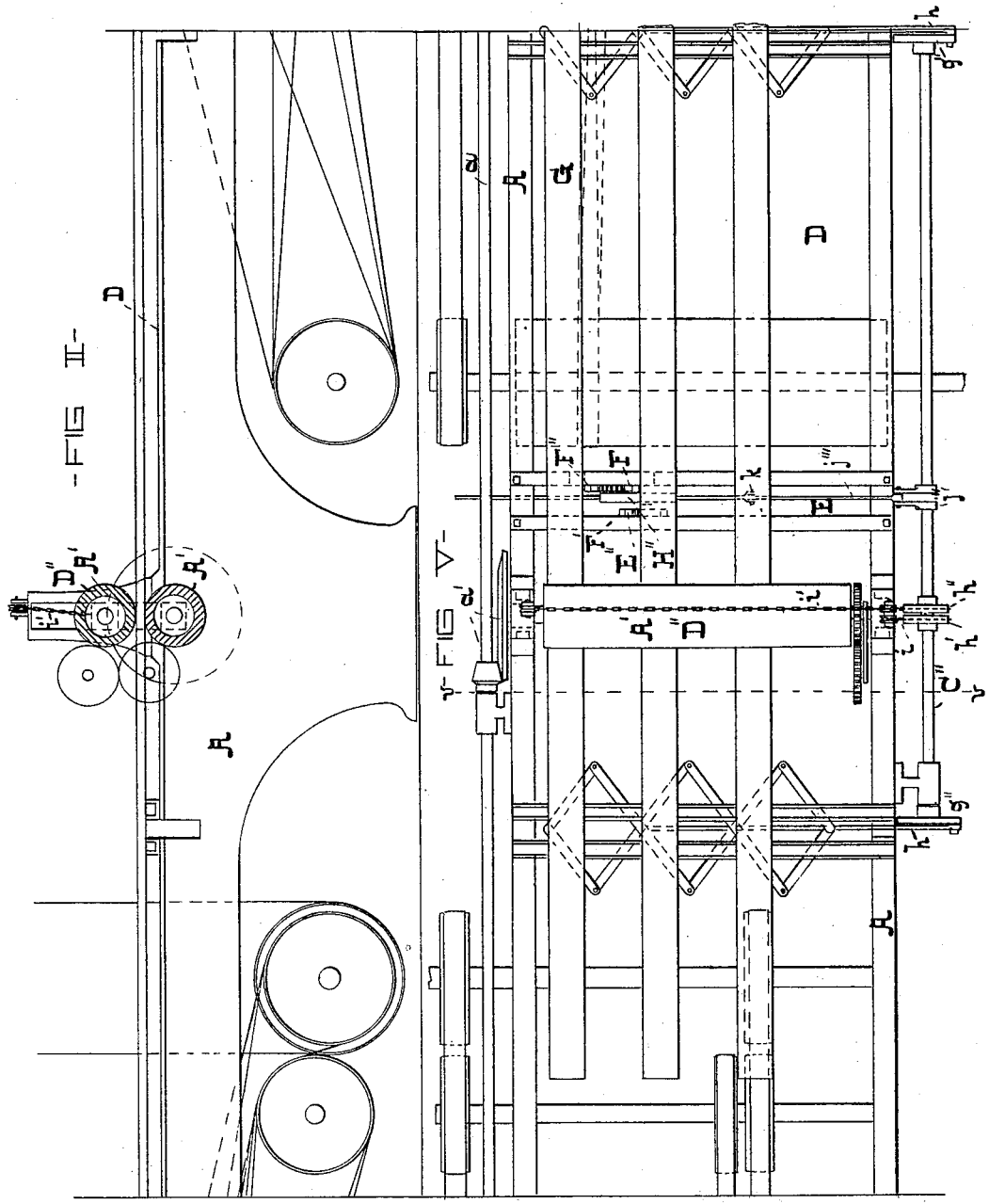
Witnesses:
Edward A. Osse,
Dan'l Fisher
Inventor
GREENLEAF JOHNSON JR.
by G.H. & W.T. Howard
Atty.
N. PETERS, Photo-Lithographer, Washington, (No Model.) 9 Sheets—Sheet 3.
G. JOHNSON, Jr.
MACHINE FOR MAKING TONGUE AND GROOVE FLOORING.
No. 366,841. Patented July 19, 1887.
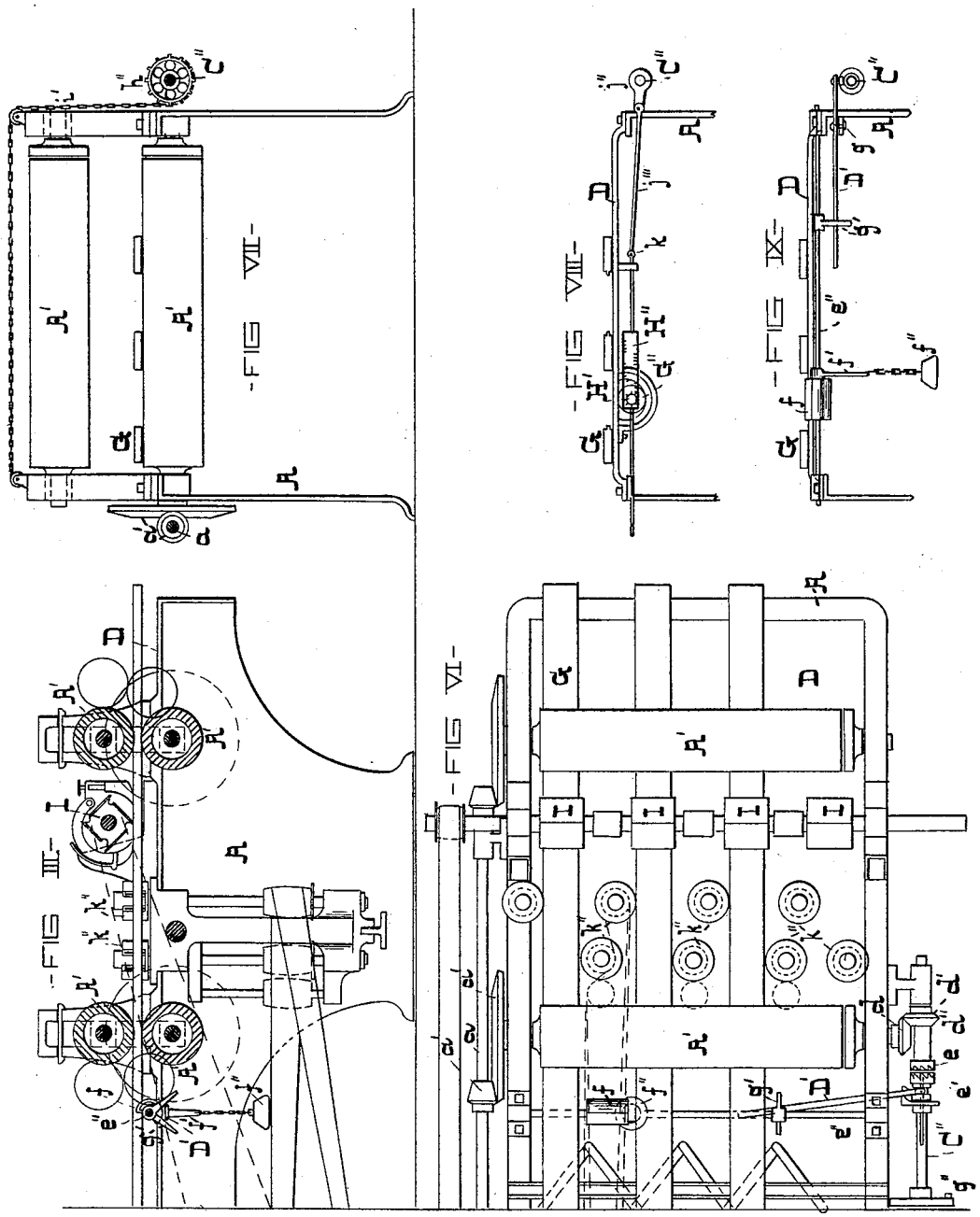
Witnesses:
Edward E. Osse,
Dan'l Fisher
Inventor
GREENLEAF JOHNSON JR.
by H. T. Howard, Atty.

(No Model.) 9 Sheets—Sheet 4.
G. JOHNSON, Jr.
MACHINE FOR MAKING TONGUE AND GROOVE FLOORING.
No. 366,841. Patented July 19, 1887.
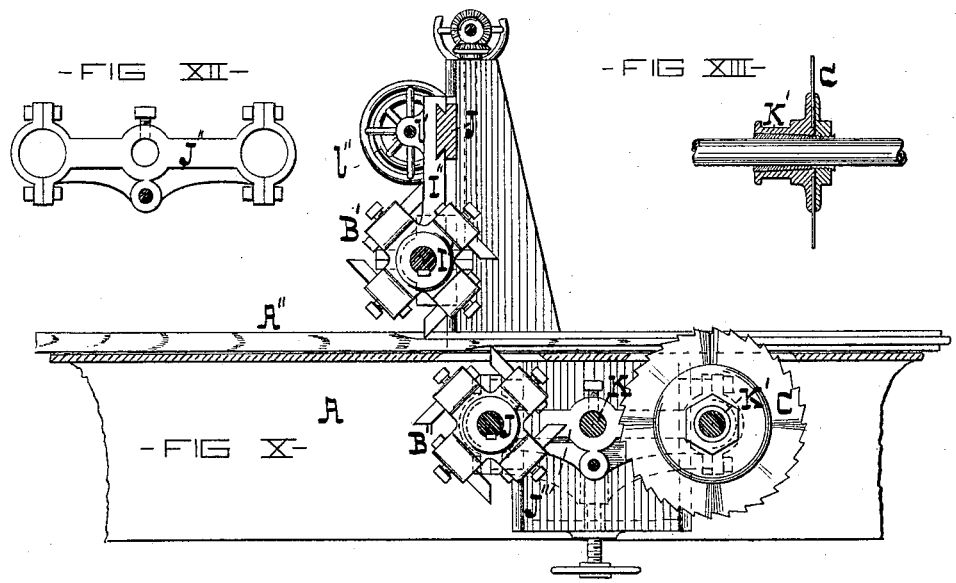
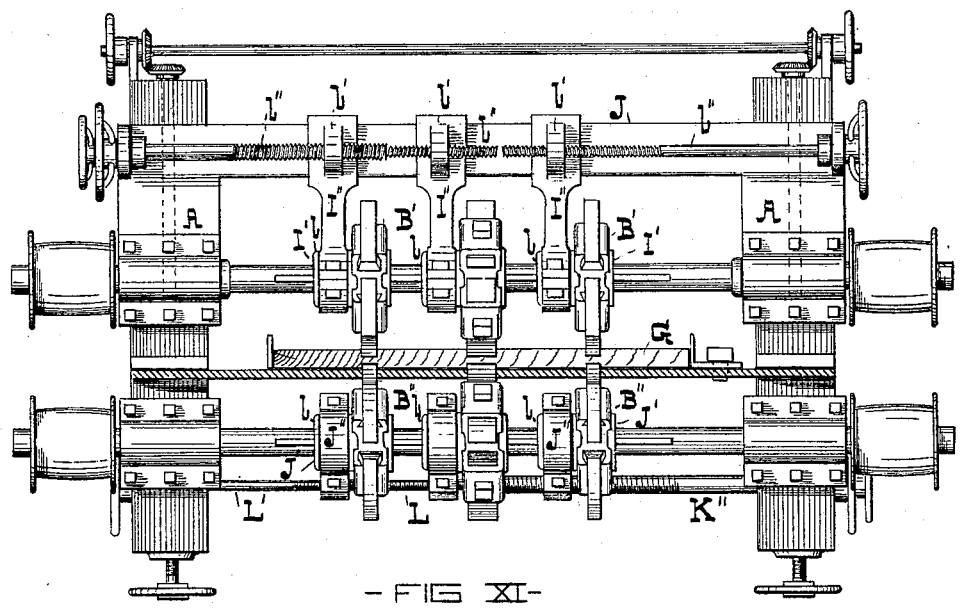

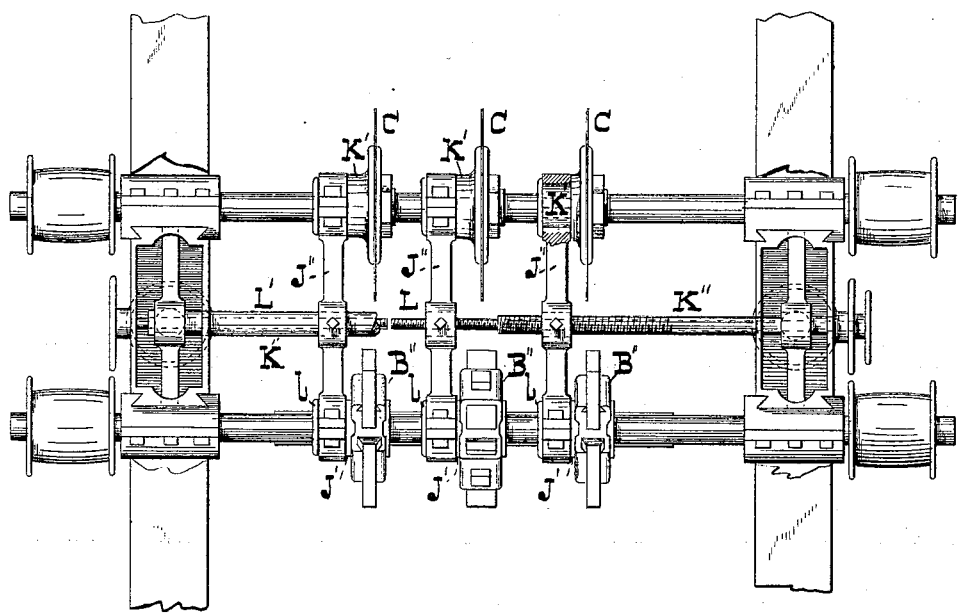

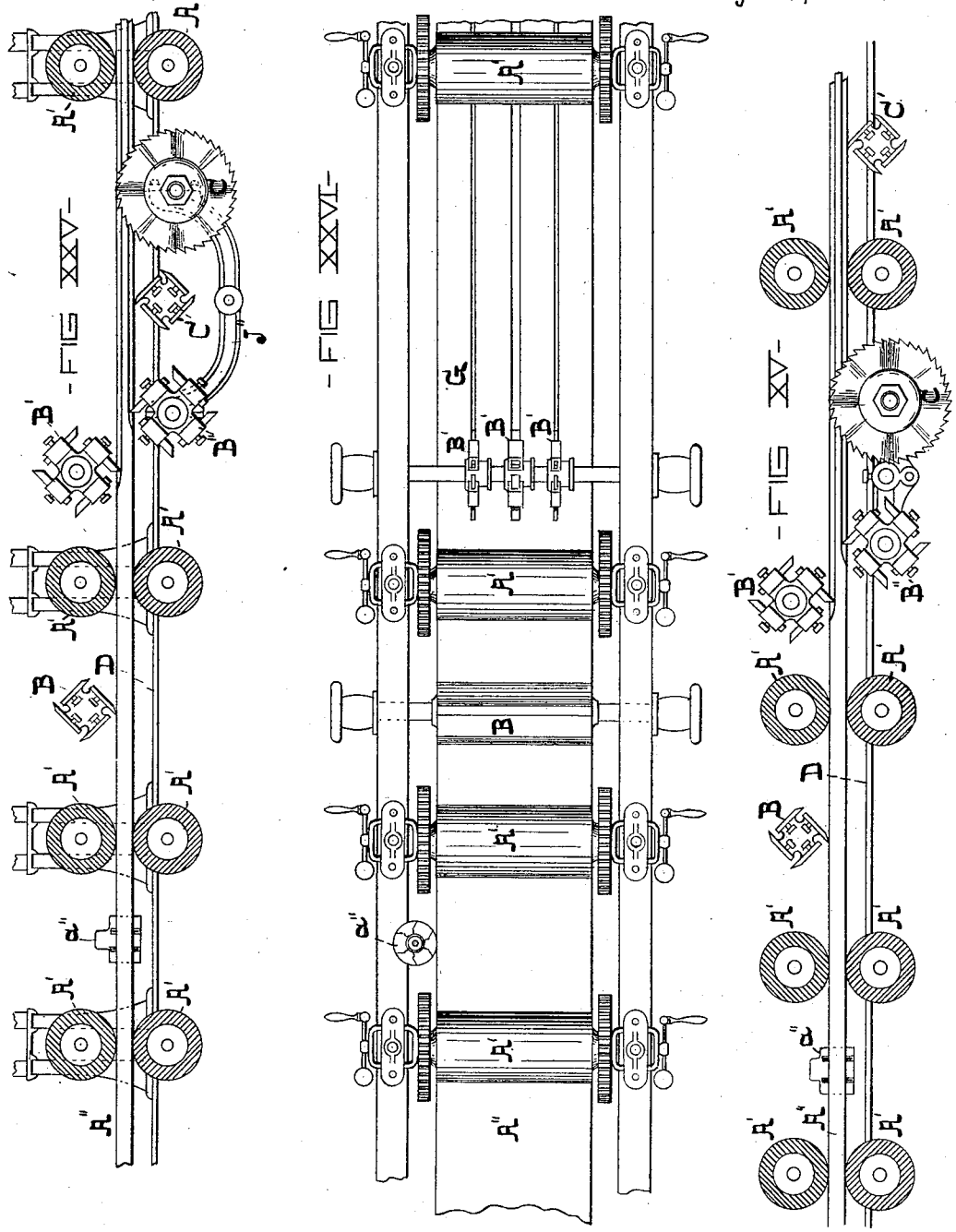

(No Model.) 9 Sheets—Sheet 7.
G. JOHNSON, Jr.
MACHINE FOR MAKING TONGUE AND GROOVE FLOORING.
No. 366,841. Patented July 19, 1887.
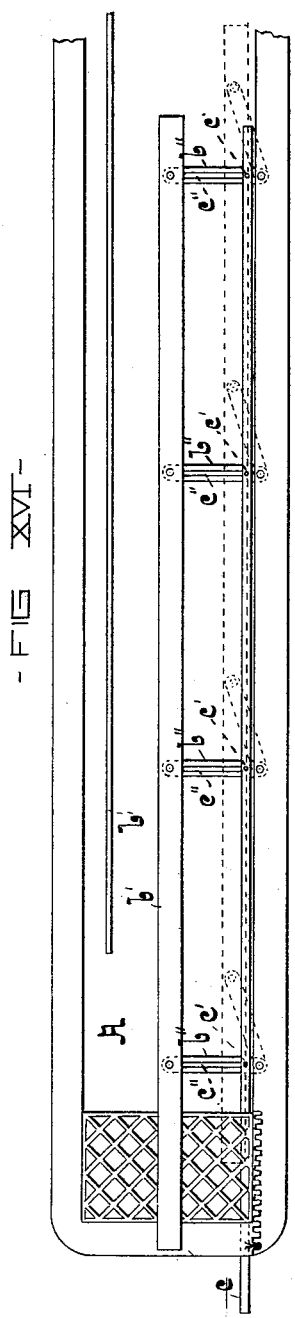
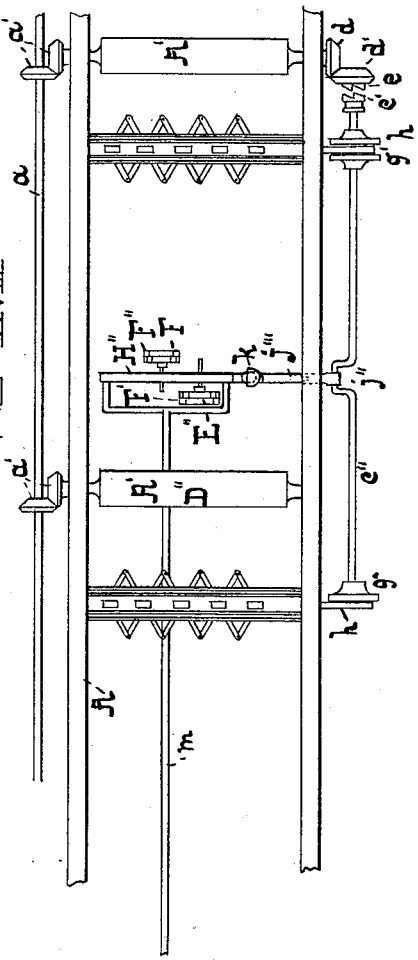
WITNESSES
Dan'l Fisher
Edwin H. Howard
INVENTOR
Gurnley Johnson, Jr.
by G.H.&H.T. Howard,
Att'y

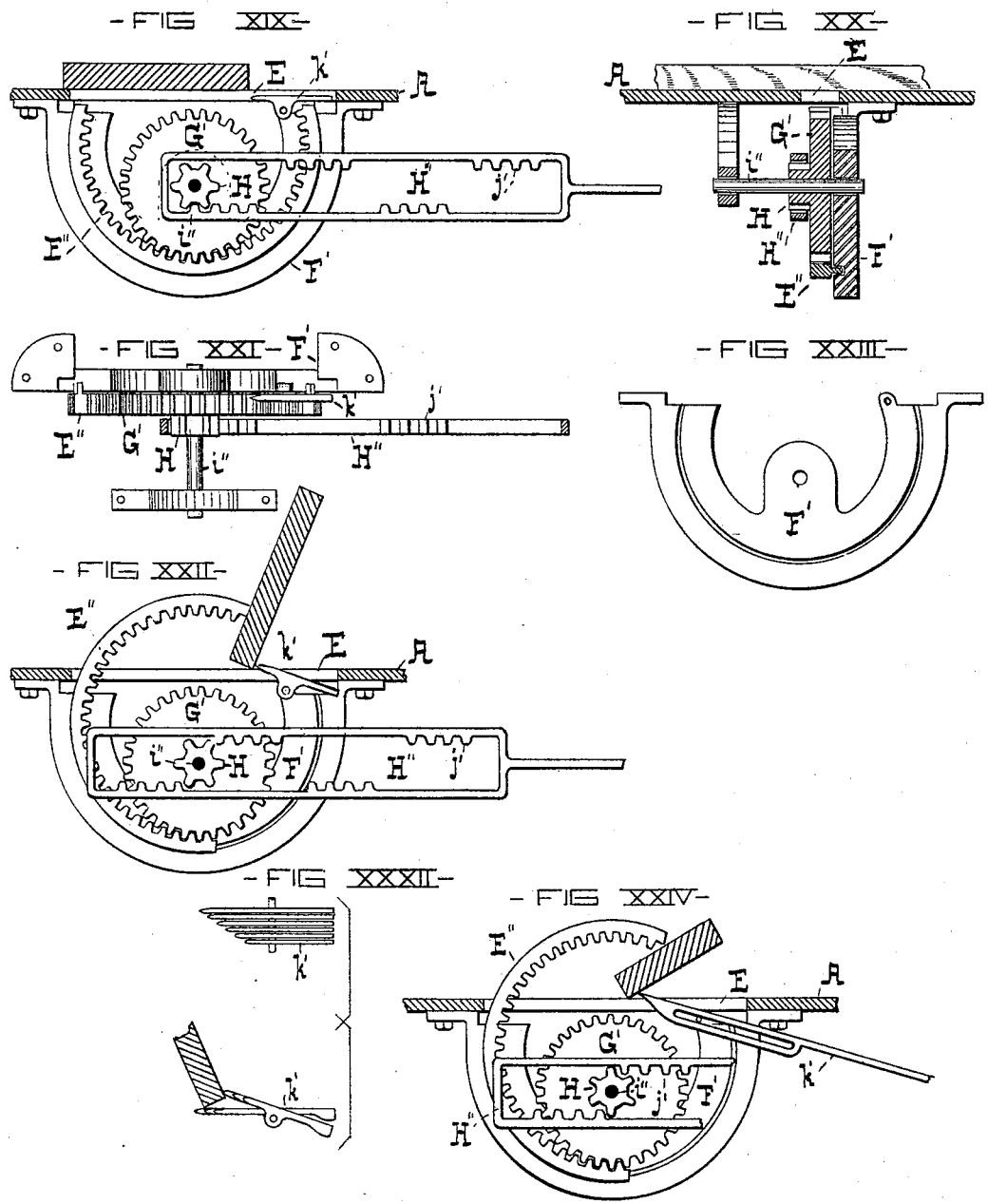

(No Model.)  9 Sheets—Sheet 9.
G. JOHNSON, Jr.
MACHINE FOR MAKING TONGUE AND GROOVE FLOORING.
No. 366,841. Patented July 19, 1887.
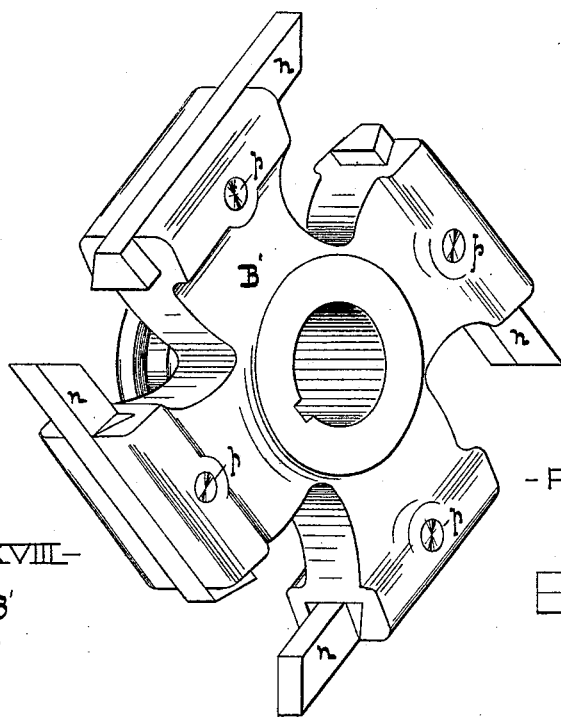
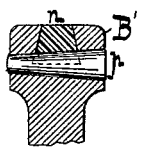
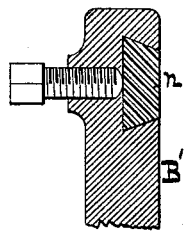
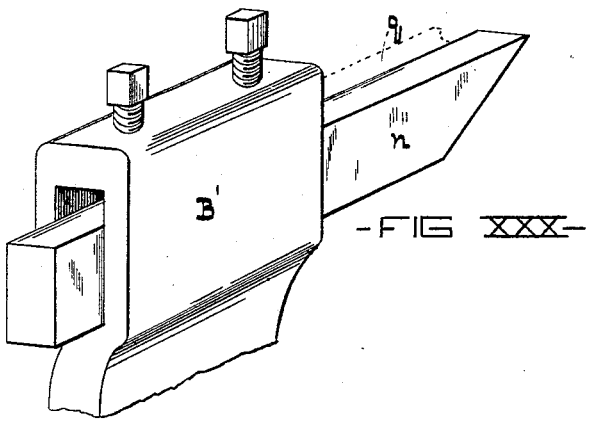
Witnesses:
Edward A. Osse,
Dan'l Fisher
Inventor
Gunlof Johnson, Jr.
by G.H.H.J. Howard,
Attorney

UNITED STATES PATENT OFFICE.

GREENLEAF JOHNSON, JR., OF BALTIMORE, MARYLAND.

MACHINE FOR MAKING TONGUE-AND-GROOVE FLOORING.

SPECIFICATION forming part of Letters Patent No. 366,841, dated July 19, 1887.

Application filed March 17, 1886. Serial No. 195,502. (No model.)

*To all whom it may concern:*

Be it known that I, GREENLEAF JOHNSON, Jr., of the city of Baltimore and State of Maryland, have invented certain Improvements in Machines for Making Tongue-and-Groove Flooring, of which the following is a specification.

In the drawings forming a part hereof, Figures I, II, and III, taken together, represent a side elevation, partly in section, of the improved machine; and Figs. IV, V, and VI a top or plan view of the same. Fig. VII is a cross-section of Fig. V, taken on the dotted line $v\ v$. Figs. VIII to XXIV, inclusive, are details of the machine, as hereinafter described. Figs. XXV and XXVI illustrate modifications of certain parts of the invention. Figs. XXVII to XXXI illustrate a cutter-head to be used in the improved machine. Fig. XXXII illustrates a modification, hereinafter described.

A is the frame of the machine, which may be of any suitable design.

$A'\ A'$ are feed-rollers of the kind generally employed in machines of this class, and they consequently need no description herein. These feed-rollers are driven by means of a shaft, $a$, constantly in revolution, and suitable connecting beveled gears, $a'\ a'$.

The rough plank, from which the tongued and grooved boards are produced, is represented by $A''$, and it is shown in Figs. I and IV. This plank is entered between the first pair of feed-rollers, and as it advances it is made parallel, if not already parallel, in width by means of the vertical cutter-head $a''$. (Shown particularly in Figs. I and IV.) This cutter-head also reduces the plank to the desired width, provided it is not of the desired width, before being entered. The edge of the plank is now forced against the stationary guide-strip $b$ by means of the laterally-moving strip $b'$. (Shown in Figs. XVI and XVII.) By referring to these figures it will be seen that the movable strip $b'$ is attached to the frame A by means of parallel links $b''$, and these links are operated to move the strip $b'$ toward and from the fixed strip $b$, so as to confine, under all circumstances, the plank in its proper place, by means of the rod $c$, which has pins $c'$ resting in slots $c''$ in the said links. In order that any desired distance between the movable and fixed strips can be obtained and preserved, the rod $c$ is provided with a tooth, and some part of the frame A with a number of teeth, with which the said tooth will engage. These teeth are not shown. I do not, however, confine myself to the exact arrangement shown for transmitting movement to the parallel links $b''$, as various other devices could be substituted for those illustrated without departing from the spirit of the invention. The plank next passes to the upper surfacing-cutter, B, and thence to the upper and lower channeling-cutters, (represented, respectively, by $B'$ and $B''$,) by means of which cutters the board is channeled, so that tongues may be subsequently produced. After the plank is channeled, it passes to the saws C C, which rip or sever the plank longitudinally into boards, which are separated and otherwise manipulated to complete them in subsequent operations, hereinafter described. The boards now pass over the lower surfacer, $C'$, and thence to the separating and tilting or overturning mechanism, the former of which corresponds in all essential particulars with that shown and described in Letters Patent No. 338,973, granted to me on the 30th day of March, 1886, for a planing and matching machine. The differences which do, however, exist will be described in connection with the description of the contrivances employed to place the said separating devices in operation.

The shaft $a$, before alluded to as in constant revolution, is situated at one side of the frame A, and receives its motion from the main driving-shaft of the machine, which is not shown, by means of any suitable power-transmitting mechanism.

$C''$ is a shaft adapted to rotate in bearings on the side of the frame opposite to that adjoining the shaft $a$, and receives its rotary motion from the said shaft through the medium of the beveled gears $d\ d'$, the former being attached to the end of one of the feed-rolls $A'$, and the latter to the said shaft $C''$. (See particularly Fig. VI.) The rotary motion of the shaft $C''$ is not, however, constant, but is effected at stated and fixed periods in order that the boards may be separated and one or more of their number overturned after all the boards have cleared the ripping-saws. To effect this intermittent rotation of the shaft $C''$, the gear $d'$ runs loosely on the shaft, and is provided with a sleeve, $d''$, having a clutch, $e$, adapted to engage with a similarly-shaped clutch, $e'$, which rests on a feather on the said shaft $C''$. To place the shaft $C''$ in revolution, it is necessary that the clutch $e'$ should be slid on the said shaft until it engages with the other clutch, $e$, which is constantly in rotation. To effect this sliding motion of the clutch $e$, it is required that the prime mover should be one of the boards, and I accomplish this result as follows: A small shaft, $e''$, extending across the frame A and resting in suitable boxes, is provided with a tripper, $f$, which projects above the upper surface of the bed D. On the shaft $e''$ is keyed an arm, $f'$, to which is attached a weight, $f''$, which serves to retain the tripper yieldingly in an upright position, or one in which it projects above the bed D.

$D'$ is a lever, with its fulcrum at $g$, having its short arm connected to the sliding clutch $e'$ and its long arm free. The vibration of this lever throws the clutch $e'$ either in or out of gear with the one $e$. To effect the vibration of this lever primarily from the boards through the medium of the shaft $e''$, I provide the said shaft with a fork, $g'$, which straddles the long arm of the lever $D'$, as shown particularly in Figs. III, VI, and IX.

As before stated, the board-separating device corresponds in all essential particulars with that shown in the said Letters Patent, and this device is connected to crank-disks $g''$ $g''$ on the shaft $C''$ by means of the connecting-rod $h$. One of the upper feed-rolls, $A'$, further denoted by $D''$, and which is over the boards both before and after their separation, is, for the purpose of admitting of this separation and the overturning of one or more of the separated boards, adapted to be lifted from its normal position. This elevation of the roll $D''$ is described in the said Letters Patent, as is also the means for effecting that result; but in the present invention the actuating means are different. They consist of two chain-heads, $h'$ and $h''$, keyed or otherwise secured to the shaft $C''$. To these chain-heads are attached the chains $i$ and $i'$, which pass over suitable sheaves and are connected to sliding boxes in which the ends of the roll $D''$ rest.

Immediately before the commencement of the separation of the boards the shaft $C''$ begins to rotate, as before described, and the winding of the chains $i$ and $i'$ lifts the roll $D''$. If the only object in lifting the roll $D''$ were to allow of the separation of the boards, very little elevation would be required; but, as before stated, one or more of the said boards may have to be overturned. Therefore the said roll must be and is elevated to a height greater than the width of the boards.

To understand why it is necessary in some cases to overturn one or more of the boards, it must be known that in lumber of an inferior grade, known in the market as "No. 2 stuff," much of it has a portion of one side better than the other; but the defects are not uniform throughout its width, which would admit of the better side being dressed as the upper one. It is therefore necessary that where, say, one board of the series has its better side underneath, this board should be turned before the upper side is dressed. By this turning process I am enabled to produce a better quality of flooring from No. 2 stuff than has been done heretofore.

The means which I preferably employ to overturn the boards consists as follows: The bed D of the machine, at a point immediately in the rear of the feed-roll $A'$ $D''$, (see Fig. V,) is provided with an opening, E, in which are placed two semi-annular racks, $E''$ and F, supported in frames $F'$ and $F''$, bolted to the under side of the bed of the machine. (See Figs. XIX to XXIV.) These racks are so placed as to be directly under one or more of the boards before their lateral separation. In all cases the board G is neither moved laterally nor overturned. Consequently the plank is placed in the machine with the best upper edge next to the fixed guide-strip $b$. The semi-annular racks $E''$ and F are made to tilt, as shown in Fig. XXII, by means of the gears $G'$ and $G''$ on the shafts $i''$ and $j$, in mesh therewith, the pinions H and $H'$ on the said shafts, and the frame $H''$, which has teeth $j'$ on its opposite inner faces. These teeth are in groups, and the groups are not opposite each other, so that in the movement of the said frame $H''$ laterally of the machine only one group will engage with a pinion at one time. (See Figs. XIX and XXII.) The motion of the frame $H''$ is obtained from the cranks $j''$ $j''$ in the shaft $C''$, through the medium of a rod, $j'''$.

Either of the semicircular racks $E''$ and F may be made operative to overturn a board by simply shifting the frame H longitudinally of the machine in a forward or backward direction, so as to unite with the pinion H or the other, $H'$, and this movement of the frame is accomplished by hand through the medium of the bar $m$, having the branches $m'$, by means of which it is attached to the said frame. (See Fig. XVIII.) In this figure the pinions H H are omitted to save complication, but the semicircular racks $E''$ F are shown.

The bar $m$ leads to the end of the machine, so as to be accessible to the attendant.

To admit of the complex movement of the frame H, the joint $k$, where the rod $j'''$ connects with the said frame, is made of the universal order.

When the frame $H''$ is placed in a central position, or between and out of gear with both the pinions $H'$ and H, the reciprocating motion of the rod $j'''$ accomplishes no result, and the overturning-racks are inoperative. It will be understood that the overturning devices are not used when the plank is uniform in quality throughout its entire surface.

By reference to Figs. XIX and XXII, it will be understood that in one forward movement of the frame $H''$ a group of teeth on either side of the frame is brought into play and the pinion with which it is made to gear revolved in two directions. Consequently the semi-annular rack is carried from the position shown in Fig. XIX to that represented in Fig. XXII and returned. When this movement takes place under a board, the rising end of the rack comes in contact with the under side of the board and lifts one edge of it, and as the board is prevented from sliding laterally, by means hereinafter described, it is overturned. (See Fig. XXII.) The device employed for holding the lower edge of the board as the board is overturned consists of a pivoted dog, $k'$, the short end of which is pointed and rises as the longer and heavier end, which is normally supported by the end of the rack, falls in the withdrawal of the same from contact therewith. (See Fig. XXII.)

From the foregoing it will be seen that at the pleasure of the attendant any board having an imperfect upper surface, as described, may be turned over and the said surface thrown underneath. This overturning of a board in a planing and matching machine being entirely new, I do not confine myself to the exact devices shown and described herein for producing that result, this part of the invention extending, broadly, to means for overturning a board in a machine of this class.

After the boards are separated and one or more of their number overturned, if such overturning is found necessary, the boards pass to the matching-cutters $k''$, which are described in the said Letters Patent, by means of which the grooves in the edges of the boards are made and the tongues finished. The boards next pass under the second top surfaces, I I, which are only used in case No. 2 stuff is worked and the first top and lower dressers are not employed.

As in changing the positions of the various channelers and saws, so as to produce boards of most desirable and different widths, the independent adjustment of the said cutters and saws would entail much loss of time, I therefore arrange the channelers and saws, or some of them, for collective lateral movement.

Referring to Figs. X and XI, it will be seen that the upper groovers or channelers, $B'$, do not rest on their respective shafts, but on sleeves $I'$, adapted to slide on feathers on the said shafts. $I''$ $I''$ are arms adapted to have a longitudinal movement on the cross-piece J of the frame A, on which they are dovetailed. (See Figs. X and XI.) The lower ends of the arms $I''$ $I''$ fit loosely over the sleeves $I'$, and are confined laterally between collars $l$ and the sides of the cutter heads. Each arm has a projection, $l'$, with a threaded hole through which extends a threaded stem, $l''$, which may be turned from the side of the machine, in order to shift the arm and with it the cutter-heads. For sake of convenience the stem which operates the central channeler passes through one of the others. (See Fig. XI.) If desired, the stems may all be of different sizes, the smaller ones passing through the larger ones, and the handles for turning them placed on the same side of the machine.

The lower channelers, $B''$, are on sleeves $J'$, which slide loosely on their shafts in a manner similar to those above described, and their shifting arms $J''$ move laterally on a bar, K, and are connected to sleeves $K'$, carrying the circular saws C. These arms $J''$, together with the lower channelers and the circular saws, are adjusted without their relative positions being changed or affected by means of threaded stems $K''$, L, and $L'$, similar to those before referred to.

Fig. XII shows a side view of one of the shifting arms $J''$.

Fig. XIV is a top view of the lower channeling-cutters and their saws and attachments.

In Fig. XXV the arms $J''$ are curved, so as to admit of the lower dresser being situated between the lower channelers and the circular saws.

If desired, the upper channelers can be connected with the lower ones and with the circular saws, in order that one set of adjusting-stems may be dispensed with, and the circular saws may have a slight independent lateral movement, so that they can be transferred from one side of the channels to the other. This independent adjustment of the saws is only required when working No. 2 stuff to prevent a tongue being formed on the wrong edge of the board or where a groove is to be cut.

In Fig. XVIII the frame $H''$ is shown as adapted for movement forward and backward of the machine by means of a rod, $m$, leading to the forward end.

It will be understood that by providing the machine with laterally-adjustable channeling-cutters and ripping-saws, the positions of which are easily and rapidly changed, lumber of promiscuous widths can be made into flooring with about as little waste as stock-lumber which has a considerably higher market value.

I do not wish to be restricted to the devices shown and described for effecting the lateral adjustment of the channeling-cutters and saws, as I believe that it is new in a machine of this description to embody therein laterally-adjustable channeling-cutters, and to combine the said cutters with saws in order that these may be collectively adjusted.

In the machine above described it will be seen that the intention is to surface the boards before the completion of the tongues and grooves; but it is not absolutely necessary that the various operations above described should be performed in the order set forth, as the surfacing-cutters could be placed at the rear end of the machine and the upper and lower surfacing of the boards be performed after the completion of the tongues and grooves.

Fig. XXVII is a perspective view of one of the channeling cutter heads, and Figs. XXVIII and XXIX are details of the same. The dovetailed knives $n$ $n$ are notched at their under sides, and the notches, denoted by $o$ in all the cutters, occupy the same relative positions. Tapering pins $p$ are passed through the cutter-head and through the notches in the knives, the notches being tapered, as shown in Figs. XXVIII and XXIX. By this means, if the knives are all identically the same, their ready and accurate adjustment in the cutter-head is easily accomplished.

In Fig. XXX the knives are held in cavities in the head by means of set-screws, and in Fig. XXXI they are dovetailed into the side of the head.

When the edges of the boards are required to be beaded, as in partition stuff, the channeling cutters or knives can have the addition marked $q$. (Shown in dotted lines, Fig. XXX.) This addition can either be formed as a part of the knife proper or separate from it, as preferred.

In Fig. XXIV the dog $k'$ is slotted and the pivotal pin which passes through it stationary, in order that the dog may be adjusted to suit boards of various widths.

Fig. XXXII shows two views of a dog which differs from that shown in Fig. XXII in that it is composed of a number of independently-moving sections of various lengths. It will be seen that this dog is automatic in its adjustment with reference to boards of different widths, as only those sections the pointed ends of which are entirely clear of or not covered by the board rise as the supporting end of the semi-annular racks $E''$ and $F$ are withdrawn from contact with the longer arms. Of the sections of the dog which rise at their pointed ends, only the longest one is operative to hold the board, as shown in Fig. XXXII. It will be understood that the devices for separating the boards herein shown, and which are more particularly described in Letters Patent aforesaid, are of such character as to move the boards laterally and parallelly; but it is not absolutely necessary that the boards shall be moved in parallel lines, but only that they shall be ultimately placed in isolated positions and parallel with each other.

I do not claim the method described herein of producing tongued and grooved boards, as the same forms the subject-matter of application, Serial No. 239,817, pending herewith.

I claim as my invention—

1. In a machine for making tongue-and-groove flooring, a cutter-head carrying channeling-knives adapted to slide longitudinally of its shaft, and a circular saw adapted to slide longitudinally of its shaft, combined with a connecting-arm and means to adjust the said arm laterally of the machine, and with it the said cutter-head and saw, substantially as and for the purpose specified.

2. In a machine for making tongue-and-groove flooring, a cutter-head carrying channeling-knives secured to a sleeve adapted to slide longitudinally of its shaft, and a circular saw secured to a sleeve adapted to slide longitudinally of its shaft, combined with a connecting arm and means to adjust the said arm laterally of the machine, and with it the said cutter-head and saw, substantially as and for the purpose specified.

3. In a machine for making tongue-and-groove flooring, the combination of a bed having a fixed guide-strip, a second guide-strip adapted to have a movement toward and from the first, a series of slotted parallel links pivoted to the said movable strip and to some fixed part of the bed, and a bar having motion longitudinally of the machine, with a pin which rests loosely in the slot of one of the parallel links, whereby the said movable strip is adjusted, substantially as and for the purpose specified.

4. As means to effect a movement of the clutch $e'$ longitudinally of the feathered shaft $C''$, on which it rests, and bring the same into contact with the continuously-rotating clutch $e$, to cause the revolution of the said shaft through the medium of a board carried longitudinally of the bed of the machine, the combination of the said shaft $C''$, the clutches $e$ and $e'$, and the shaft $e''$, resting loosely in bearings, the tripper $f$, secured to the shaft $e''$ and in the path of the advancing board, fork $g'$, and lever $D'$, having one end connected with the sliding clutch $e'$ and the other situated between the tines of the fork $g'$, substantially as and for the purpose specified.

5. In a machine for making tongue-and-groove flooring, cutters to rip a plank into boards, combined with a tilting device to overturn one or more of the said boards, and surface-dressers situated in the path of the overturned boards to dress one side only of the same, substantially as specified.

6. In a machine for making tongue-and-groove flooring, a semicircular board-overturning rack having interior teeth adapted to have a circumferential motion in and through the bed of the machine, substantially as shown, combined with a gear-wheel in engagement with the teeth of the said rack, devices to rotate the said gear-wheel, and a hinged pivoted dog supported in a horizontal position by one end of the semicircular rack when the same is wholly below the surface of the bed of the machine, and adapted to tilt as the supporting end of the said rack descends, and thereby engage with the edge of a board situated over the said rack, substantially as specified.

7. In a device for overturning boards on the bed of a planing and matching machine, the combination, with a semi-annular tilting rack, of a series of dogs of different lengths mounted side by side on a single pin, whereby boards of different widths are prevented from sliding laterally while they are being overturned, substantially as described.

8. In a machine for making tongue-and-groove flooring, a cutter-head having knives adjustable in projection beyond the periphery of the same, and provided with a series of semicircular notches in their edges, combined with a tapered pin for each knife, which passes through the said head and through a notch in the adjoining knife, substantially as and for the purpose specified.

9. In a machine for making tongue-and-groove flooring, a cutter-head carrying channeling-knives adapted to slide on or be adjusted longitudinally of its shaft, combined with a circular saw adapted to be adjusted longitudinally of its shaft, the said saw being in the rear of the said channeling-knives, whereby a plank can be grooved and cut into boards of various widths for after finishing or working, substantially as and for the purpose specified.

10. In a machine for making tongue-and-groove flooring, a cutter-head carrying channeling-knives adapted to slide on or be adjusted longitudinally of its shaft, and a circular saw adapted to slide longitudinally of its shaft, combined with surfacing-cutters situated in the rear of the said channeling-knives and saws, whereby a plank is first grooved, then separated into boards, and then the separated boards surfaced, substantially as and for the purpose specified.

GREENLEAF JOHNSON, JR.

Witnesses:
WM. T. HOWARD,
DANL. FISHER.